United States Patent [19]

Solt

[11] 3,844,446

[45] Oct. 29, 1974

[54] SYSTEM FOR CONVEYING SOLID PARTICULATE MATERIALS

[75] Inventor: Paul E. Solt, 529 S. Berks St., Allentown, Pa.

[73] Assignee: Fuller Company, Catasanqua, Pa.

[22] Filed: July 26, 1973

[21] Appl. No.: 382,994

Related U.S. Application Data

[63] Continuation of Ser. No. 168,876, Aug. 4, 1971.

[52] U.S. Cl.................... 222/61, 141/198, 222/64, 222/193
[51] Int. Cl............................................ B65g 53/18
[58] Field of Search................ 222/61, 193, 64, 56; 302/59; 137/403; 141/198

[56] References Cited
UNITED STATES PATENTS

| | | | |
|---|---|---|---|
| 3,237,812 | 3/1966 | Kemp | 222/193 X |
| 3,367,541 | 2/1968 | Cook et al. | 222/193 |
| 3,380,780 | 4/1968 | Allen et al. | 222/56 X |
| 3,403,941 | 10/1968 | Solt | 302/42 |

Primary Examiner—Stanley H. Tollberg
Assistant Examiner—John P. Shannon
Attorney, Agent, or Firm—Frank H. Thomson

[57] ABSTRACT

A pneumatic conveying system for use in conveying solid particulate material such as sand from a source such as a railway hopper car to a vehicle such as a locomotive for use by such vehicle. The system includes a conveyor for transferring the material from the material source to a main storage vessel. A second storage vessel is mounted on an elevated platform and positioned so that the vehicle may pass underneath. A pneumatic conveying system conducts material from the main storage vessel to the second storage vessel. A bubble tube level sensor senses the level of sand in the second storage vessel. When the level of material in the second storage vessel drops below a predetermined point, a control arrangement responsive to the bubble tube level sensor activates a valve on the first storage vessel to permit sand to be admitted to the pneumatic conveying system. When the level in the second storage vessel reaches the predetermined point, the valve on the main storage vessel is closed so that no additional material is admitted to the conveying line.

The second storage vessel is an enclosed container having a gas permeable deck dividing the container into a material chamber and an air plenum chamber. Air under pressure is admitted to the plenum chamber to pass through the permeable deck and fluidize the material in the material chamber. Valve controlled conduits extend through the plenum chamber and are flow connected to openings in the gas permeable deck for conducting material out of the material chamber.

3 Claims, 4 Drawing Figures

INVENTOR
PAUL E. SOLT

BY
Frank H Thomson
Jack L. Prather
ATTORNEY

SYSTEM FOR CONVEYING SOLID PARTICULATE MATERIALS

This is a continuation of application Ser. No. 168,876, filed Aug. 4, 1971.

BACKGROUND OF THE INVENTION

The present invention relates to a pneumatic conveying and storage system and in particular to a pneumatic conveying and storage system which has particular application for use in supplying sand to hopper boxes on locomotives. The invention also relates to a container for receiving, storing and discharging solid particulate material such as sand and in particular to a container which substantially increases the rate at which material may be discharged therefrom.

It is well known in the railroad field that it is often necessary to "sand" the tracks in order to obtain better traction. This particularly true when a heavy load is being hauled up a hill or when the locomotive starts from a standing position. In order to carry the sand which is placed on the tracks, the locomotives are equipped with one or several hopper boxes. Periodically, it is necessary to fill these hopper boxes. Heretofore, various systems have been used for supplying these hopper boxes with sand. Two systems commonly used employ pneumatic conveying. In one system, the sand is conveyed directly into the hopper on the locomotive through a conveying line. Another system used a container positioned over the tracks with a pneumatic conveying system for supplying sand to this container. The sand is conducted to the hopper boxes from this container by gravity.

Those systems which employ a pneumatic conveying system for supplying sand directly to the hoppers on the locomotive are dusty. In most applications, an operator must hold the conveying line directly over the hopper. The air used for conveying the sand tends to cause the sand to fly out of the hopper thus making the job of filling the hoppers quite dusty.

In those systems which employ a container mounted over the tracks, the container is a simple tank-like container with feed pipes connected to the bottom of the container. The pipes are used to convey the sand from the container to the locomotive by means of gravity. These pipes are usually mounted so that they extend from the container at an angle of about 45°. Since the locomotive mounted hoppers may be on either or both sides of the locomotive, in order to place the pipes at the desired angle, the containers must be elevated as much as 40 feet. This makes such an installation very expensive.

A further disadvantage of prior systems that employ an elevated container for the sand is the length of time it takes to service a locomotive. With prior systems, it can take up to an hour to service a train. Although other servicing such as lubrication is being done during this period, the filling of the sand hoppers takes substantially longer than other maintenance requirements. It would be desirable to substantially decrease the time required to fill the sand hoppers.

An additional disadvantage with prior elevated containers is that no means is provided for insuring that the container holds enough sand to service a train. If the elevated container becomes empty during the servicing of a train, it must be at least partially filled before the servicing can be completed. This increases the time required to fill the locomotive mounted hoppers.

SUMMARY

It is the principal object of this invention to provide a system for supplying sand to a vehicle such as a locomotive which is less time consuming to use and less expensive to install than prior systems of this type.

It is a further object of this invention to provide a container which permits gravity feed of granular particulate material at greatly increased feed rates.

It is a still further object of this invention to provide a novel conveying system for use in transferring granular particulate material from one storage point to another storage point.

It is another object of this invention to provide a conveying system for transferring sand or other particulate material from one storage point to another storage point which is responsive to the level of material in the second storage point.

It is still another object of this invention to provide a novel container for receiving, storing, and discharging solid particulate material which has increased rates of discharge and a novel conveying system for supplying granular particulate material from a source to that container.

In general, the foregoing and other objects will be carried out by providing a system for supplying solid particulate material such as sand to a vehicle such as a locomotive for use by the vehicle comprising a first storage vessel; first conveying means for conducting solid particulate material from a source of material to the first storage vessel; a second storage vessel mounted in a position elevated a distance sufficient to allow a vehicle to pass thereunder; second conveying means for conducting solid particulate material from said first storage vessel to the second storage vessel; conduit means for conducting solid particulate material from the second storage vessel to a vehicle; and means for sensing the level of material in the second storage vessel; said second conveying means comprising a material conveying line, means for supplying air under pressure to the conveying line whereby the air under pressure acts as a conveying medium, valve means operatively associated with the first storage vessel and said conveying line for controlling the admission of material to said conveying line, and means responsive to said means for sensing the level for controlling said valve means whereby when said sensor indicates the level of material in said second storage vessel is below a predetermined level, said valve means may be opened to admit material to the conveying line and material is conducted from the first storage vessel to the second storage vessel.

The objects of the invention will also be carried out by providing a container for receiving, storing and discharging solid particulate material comprising means defining sidewalls, endwalls, and a bottom; a gas permeable deck mounted in the container and spaced from the bottom to define a plenum chamber between the bottom and the deck and a material chamber above the deck; means for conducting gaseous fluid under pressure to said plenum chamber for passage through the gas permeable deck; said deck defining an opening therethrough; and conduit means flow connected to said opening and extending through said plenum chamber for discharging material out of the material chamber.

BRIEF DESCRIPTION OF THE DRAWINGS

The invention will be described in connection with the accompanying drawings wherein.

DESCRIPTION OF THE PREFERRED EMBODIMENT

The novel container for receiving, storing and discharging solid particulate material will be described first followed by a description of a system for pneumatically conveying material and particularly for supplying sand to a locomotive.

Figure 2:
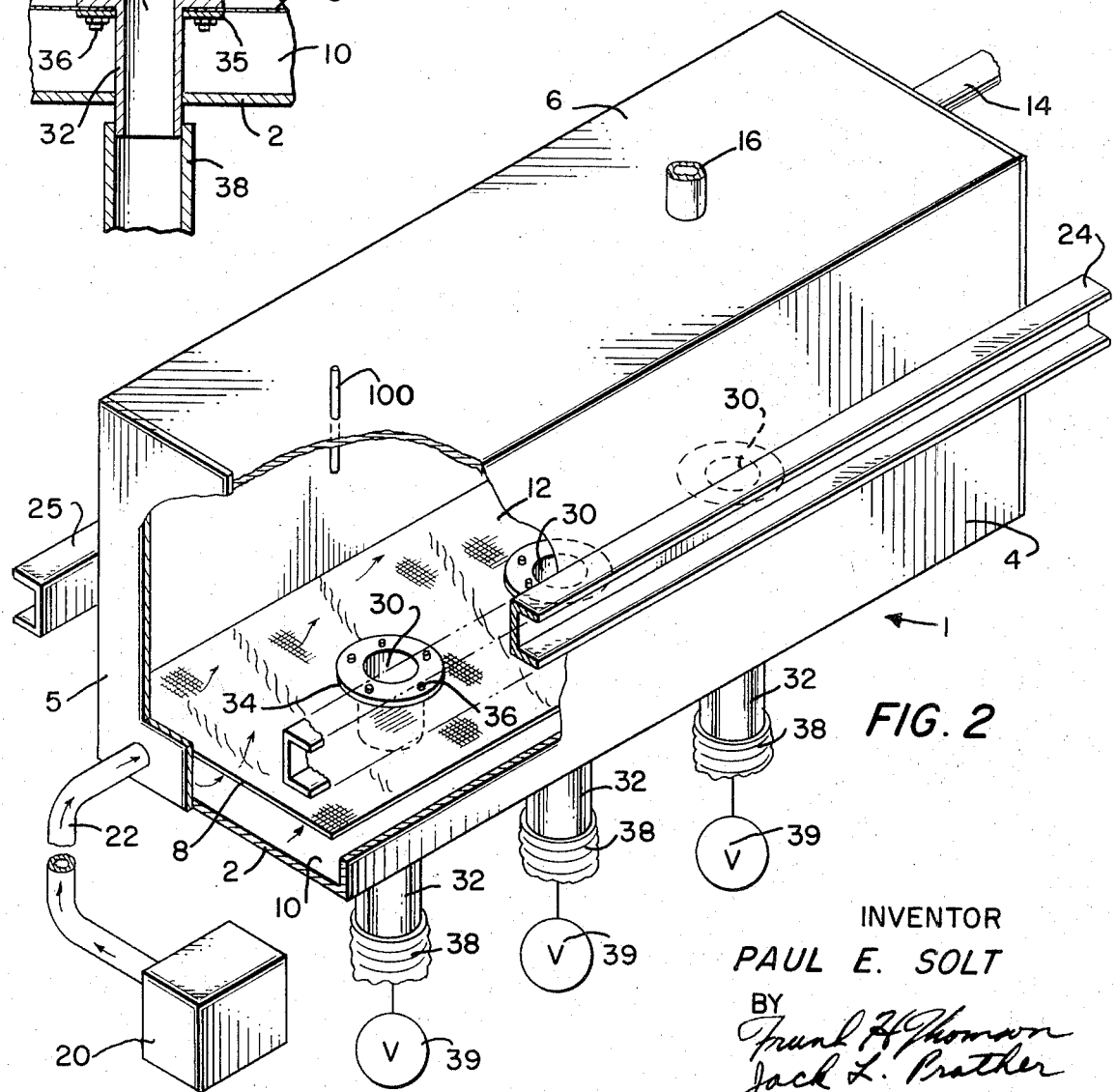
FIG. 2 is a perspective view, partly broken away, of the novel storage container of the present invention.

Referring to FIG. 2, there is shown in perspective the novel container generally indicated at 1 which includes a bottom 2, sidewalls 4, endwalls 5 and a top 6. A gas permeable deck 8 is mounted in the container 1 by any suitable means and is spaced from the bottom 2 to define an air plenum chamber 10 therebelow and a material chamber 12 thereabove. A conduit 14 mounted in the container 1 serves as a means for supplying material such as sand to the material chamber 12. A second conduit 16 may be mounted in the container 1 for communication with the material chamber 12. The conduit 16 serves as a vent for the container 1 and may be connected to a dust collector to be described later.

A source of gas such as air under pressure may be provided by a compressor or blower diagrammatically illustrated at 20 and connected by a pipe 22 to the air plenum chamber 10.

The container may be supported on an elevated platform by a pair of channel beams 24 and 25 mounted on the sides 4 of the container.

Figure 3:
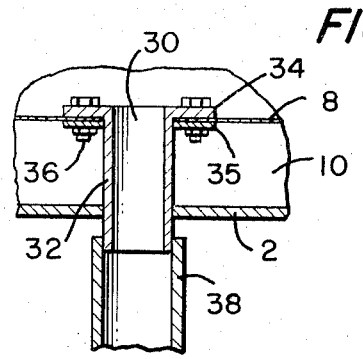
FIG. 3 is a fragmentary sectional view of a portion of the novel storage container of the present invention showing the discharge arrangement of that container.

The gas permeable deck 8 defines at least one opening 30 and in the illustrated embodiment there are three such openings. A conduit 32 is flow connected to the opening 30 in the gas permeable deck 8 and passes through the plenum 10 and bottom 2 of the container 1 as best shown in FIG. 3. The conduit 32 may include an upper annular portion 34 and may be secured to the fabric deck 8 by an annular washer 35 and fasteners 36. A second preferably flexible conduit 38 is flow connected to the conduit 32. A valve 39 is flow connected to the conduit 38 as illustrated in FIG. 2. This valve may be a ball or other standard valve and serves to control the discharge of material from the material chamber 12.

In the preferred form, the gas permeable deck 8 is substantially flat and horizontal. However, if desired, the deck may be sloped or dished a slight amount in the direction of the openings 30.

In use, the material chamber 12 is supplied with solid particulate material such as sand through the opening 14 from any source such as the conveying system of the present invention to be described below. Air under pressure is supplied from the source 20 through conduit 22 to the plenum 10 and flows through the gas permeable deck 8 to fluidize the material in the chamber 12. When it is desired to discharge material from the container, one of the valves 39 is opened and material flows by gravity through the conduit 32, conduit 38 and valve 39 to the desired discharge point.

It has been found that by fluidizing the solid particulate material, the rate at which material is discharged from the container by gravity is substantially increased. With a 2 inch discharge conduit 32 without air being supplied through the plenum 10, 200 lbs. of sand per minute could be discharged. When the material was fluidized 596 lbs. per minute were discharged. With a 3 inch discharge conduit, the discharge rate was 630 lbs. per minute without air and 1,390 lbs. per minute with air. From these figures, it should be readily apparent that the addition of fluidizing air substantially increases the rate at which solid particulate material such as sand may be discharged from a hopper. If the present container is used in a system where it is desired to supply sand at as fast a rate as possible, it will have obvious advantages over prior storage containers.

An additional advantage of the container 1 of the present invention over prior containers used in systems for filling sand hoppers on locomotives is that the discharge conduits 32 need not be positioned at the angle of repose of the material being discharged. The aeration of the sand permits the sand to flow freely through the openings 30 without sloping the deck 8 toward the openings. In addition, the level of material in the container tends to remain more uniform thereby enabling a more even flow of material through each of the conduits. By eliminating the necessity of placing the conduits 32 and 38 at the angle of repose of the material, the container need be elevated only by a distance sufficient to allow a locomotive or other vehicle to pass beneath. A further advantage is that the length of the flexible portion 38 may be substantially increased over prior practice to permit greater flexibility in using the system.

Figure 1:
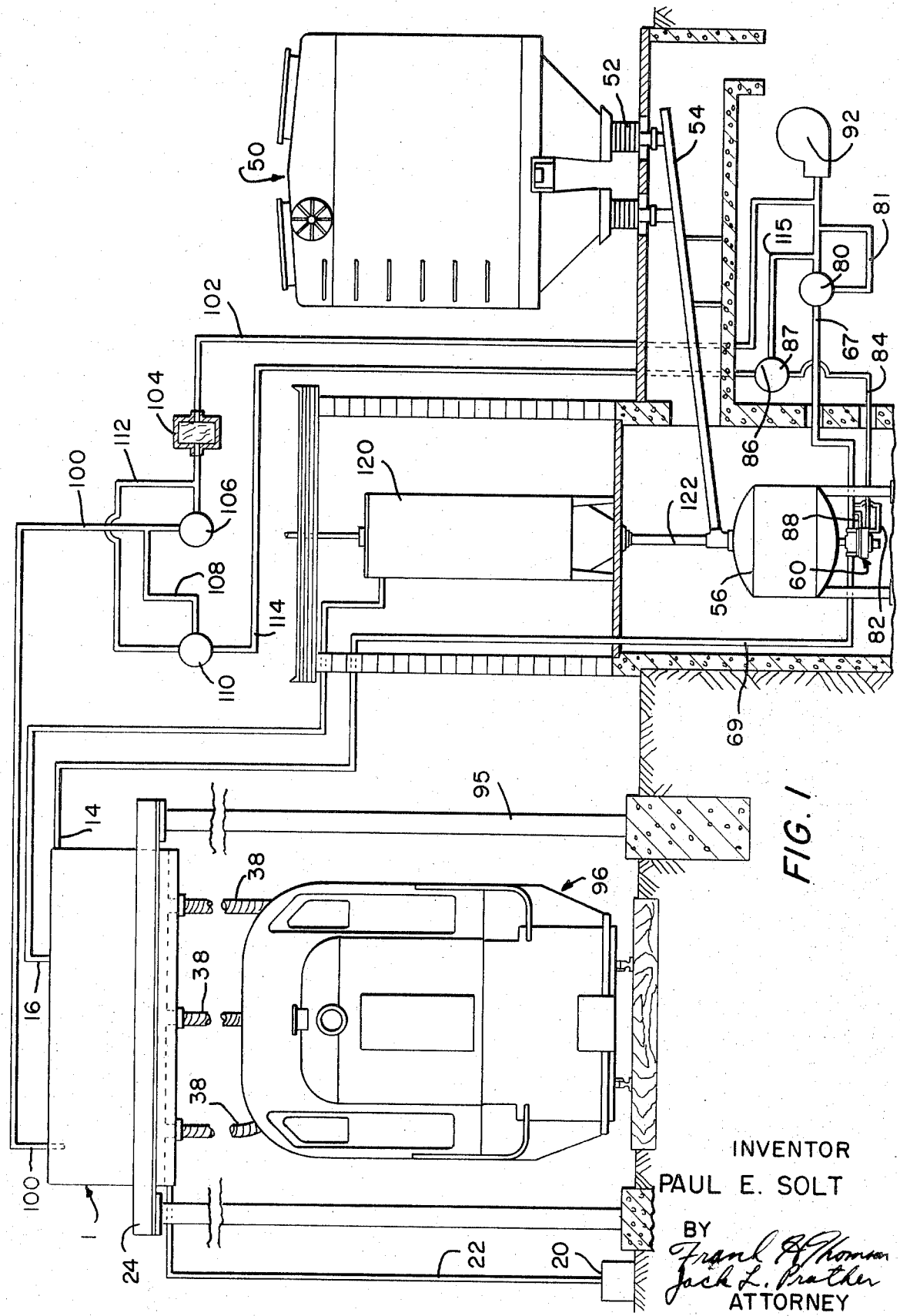
FIG. 1 is a diagrammatic view of the conveying system of the present invention as it is applied to a locomotive sanding system.

Referring now to the conveying system shown in FIG. 1, there is a source of solid particulate material such as sand generally indicated at 50 and in this case a hopper railroad car has been illustrated as the source. The hopper car 50 is positioned over an underground conveying system and discharges sand through conduits 52 onto a fluidizing gravity conveyor 54 generally known in the art. The fluidizing gravity conveyor conveys the solid particulate material to a first storage container 56 which may be of substantial volumetric size. The conveyor 54 is intended to be merely representative of a means for moving material from the source to container 56. Other systems such as a vacuum system may be used.

Figure 4:
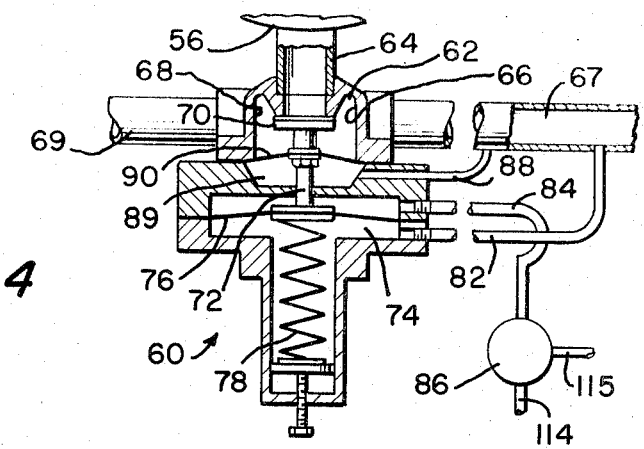
FIG. 4 is a sectional view of a valve employed by the present invention.

A valve generally indicated at 60 controls the discharge of material from the storage vessel 56. This valve is best illustrated in FIG. 4 and is the type of valve shown in my prior U.S. Pat. No. 3,403,941. The valve 60 includes a material entrainment chamber 62 having a material inlet 64 connected to the vessel 56, an air inlet 66 connected to an air supply conduit 67 and an air material discharge 68 connected to an air material outlet conduit 69. A valve member 70 serves to open and close communication between the material inlet 64 and the entrainment chamber 62 and thereby controls the discharge of material from the vessel 56. A valve stem 72 is connected to the valve member 70 and controlled by fluid flow through conduit 67 which is measured by differential pressure across a restriction upstream of the entrainment chamber 62.

The valve 60 includes chamber 74 divided by means of a flexible diaphragm 76 into upper and lower compartments. A spring 78 acts on the valve stem 72 serving to normally bias the valve member 70 into contact with the material inlet 64 and prevent the flow of material into the material entrainment chamber.

A pressure responsive valve 80 is mounted in the air supply line 67 upstream of the valve means 60. A conduit 82 is connected to the supply line 67 downstream of the valve 80 and to the lower compartment of the chamber 74 of valve 60. A second conduit 84 connected to the upper compartment of chamber 74 is connected through a normally open three way valve 86 and a conduit 115 to the conduit 67 upstream of a pressure responsive valve 80. A pressure balance conduit 88 is connected between the conduit 67 and a chamber 89 which is separated from the entrainment chamber by a diaphragm 90 to balance the pressure in the entrainment chamber 62. A suitable blower 92 is connected to the conduit 67 as shown in FIG. 1 to supply conveying air.

The valve 80 and valve 60 are similar in configuration and operation to the arrangement shown in FIG. 4 of my prior U.S. Pat. No. 3,403,941 and described therein. The valve 80 is set so that the conveying system operates at a specific pressure. In the present application, low pressures on the order of 10 to 15 psig operate satisfactorily. As described in my prior patent, the pressure responsive valve 80 may include a variable restriction extending into the air supply line 67. A conduit 81 transmits the pressure output of the blower 92 to the valve 80. If the pressure output of the blower increases, the conduit 81 transmits this pressure to the valve 80 and the restriction in the valve is opened to maintain the desired constant pressure upstream of the valve 80. If the pressure output of the blower 92 decreases, the restriction in the valve is closed to maintain the constant pressure.

The air-material conveying line 69 is connected to the conduit 14 of the container 1 of the present invention. When the pneumatic conveying system of the present invention is employed in a locomotive sand supply system, the container 1 is mounted on a platform 95 by means of the channel beams 24. The container is positioned above the tracks and spaced therefrom a distance sufficient to permit a locomotive, generally indicated at 96, to pass beneath the storage container 1.

The operation of the valve 60 will be briefly described although reference should be made to my above-mentioned prior patent for complete details. When the conduit 69 is open to permit the flow of material, air flows from blower 92, through line 67 to the entrainment chamber. The pressure upstream of the pressure responsive valve 80 will be greater than the pressure downstream of that valve. The two pressures are transmitted by the lines 82 and 84, respectively, to the upper and lower compartments of chamber 74. In the chamber 74, the two pressures are compared. As long as line 69 is open, the pressure upstream of valve 80 will be greater than the combined pressure of spring 78 and the pressure downstream of valve 80. The greater pressure on the upper side of diaphragm 76 causes the valve member 70 to move down thereby admitting material to entrainment chamber 62. From chamber 62, material is conveyed through line 69 to container 1. If line 69 should become blocked, the air flow through line 67 will stop and this stop of fluid flow will be sensed by a change in differential pressure across valve 80. The pressures on opposite sides of valve 80 and hence diaphragm 76 will become equal. With these pressures equal or nearly equal, the spring 78 will close valve member 70 to prevent material from flowing into chamber 62 from vessel 56. Thus, it can be seen that anytime the pressure below diaphragm 76 approaches, equals or exceeds the pressure above, valve member 70 will close and no additional material will be conveyed by the system.

A bubble tube level sensor 100 is connected to the container 1 and extends into the container and terminates at a predetermined level which is the maximum desired level of material in the container 1. Air under pressure is supplied from a conduit 102 connected to the blower 92 and passes through a filter 104 and a pressure regulating valve 106, which is connected to the conduit 100. In the preferred form, the pressure regulating valve is set to operate at a low pressure, for example, 2 inches of water. In other applications, it may be desirable to use a bubble tube which is supplied with high pressure air, e.g., 30 psig.

A pilot air conduit 108 is connected to the conduit 100 downstream of the pressure regulator 106 and to a normally closed two way valve 110. The valve 110 is also supplied with air from a conduit 112 which is connected to the conduit 102 upstream of the pressure regulator 106. A third conduit 114 is connected between the valve 110 and the normally open three way valve 86.

When the level of material in the container 1 is below the desired level, air passes from the blower 92 through conduit 102 to conduit 100. Because valve 110 is normally closed, air will not move through line 112 to line 114. The normally open valve 86 permits air to flow from conduit 67 upstream of the valve 80 through conduit 115 to conduit 84 and the upper compartment of the chamber 74. As long as conveying line 69 is not plugged, the pressure of this air exceeds the pressure downstream of valve 80 as reflected in the lower compartment of chamber 74 and the biasing force of spring 78 and forces the valve stem 72 and valve 70 of regulating valve 60 down against spring 78 to open material inlet 64 and permit material to enter chamber 62 and be conveyed through conduit 69 to the container 1. When the level of material in the container 1 reaches the level of the bubble tube 100, the pressure in the bubble tube will increase because the outlet of tube 100 is blocked. This increased pressure will act through pilot line 108 on normally closed valve 110 and open this valve. The valve 110 may be set to open at say ½ inch water pressure. The opening of this valve permits air under pressure to pass from line 102, through line 112, the valve 110 and line 114 to close the normally open valve 86. The closing of normally open valve 86 stops the transmission of the pressure upstream of valve 80 through conduit 115 to conduit 84 and the upper compartment of chamber 74. A dump to atmosphere 87 relieves pressure on the upper side of the diaphragm 76 in the chamber 74. The relief of pressure on the upper side of diaphragm 76 allows the pressure below this diaphragm 76 and the spring 78 to close the valve 70 and prevent the flow of additional material into the material entrainment chamber 62. Air from the blower 92 continues to flow through conduit 67 and conduit 69 to the container 1 but does not carry any additional material.

When the material is withdrawn from container 1 and the level drops below tube 100, the drop in pressure in line 100 automatically closes valve 110 which results in the automatic opening of valve 86. The pressure upstream of valve 80 is again transmitted to valve 60 and if line 69 is open, the valve member 70 is moved away from inlet 64 and material is again admitted to the conveying line and conveyed to container 1.

The conduit 16 of container 1 is suitably connected to a dust collector 120 which has a discharge 122 connected to the inlet of the storage vessel 56. This dust collector is particularly important because during operation of the system, when no material is flowing through the conveying line 69 air alone will be flowing through this conduit and a dusty condition will be created which requires a dust collector such as that shown.

The operation of the apparatus should be apparent from the foregoing description. When it is desired to service a locomotive, the locomotive is driven under the container 1. An operator may push a single button which may be connected to a suitable electrical system to start the blowers 20 and 92. He then takes one of the conduits 38 and holds it over the hopper box on the locomotive. The valve 39 is open and material from the container 1 flows at a rapid rate into his hopper box. If the material in the container 1 falls below the level of the bubble tube 100, additional material is supplied through conduit 69 to opening 14 and the container 1 is maintained at full capacity so long as there is material in the vessel 56.

The preferred form is shown with three conduits 38 because some locomotives are equipped with hopper boxes on the side of the locomotive while others have hopper boxes on either the front or rear. If desired, the container 1 may be made several hundred feet along the length of the track. This would enable an entire set of locomotives to be positioned under the sand container 1 so that the entire train may be serviced without necessitating moving the train each time one locomotive is serviced with sand and the next is ready for servicing. With the present invention, it is believed that the time required for filling the sand hoppers on a locomotive will not be longer than the time required to perform other maintenance on the locomotive.

The system is such that one or several of the discharge conduits 32 and 38 may be used at the same time. The system for conveying sand from the first storage vessel 56 operates at a greater capacity than sand can be removed from the second container 1.

From the foregoing, it should be apparent that the objects of this invention have been carried out. A storage container has been provided which permits faster discharge of material. An automatic conveying system has been provided which is particularly adapted for use in supplying sand to hoppers on locomotives, but may be used in other applications.

It is intended that the foregoing description be merely that of a preferred embodiment and that the invention be limited solely by that which is within the scope of the appended claims.

I claim:

1. A pneumatic conveying system for conveying material into a container comprising:
    a source of solid particulate material;
    a conveying line flow connecting said source and a container;
    means for supplying gaseous fluid under pressure to said conveying line whereby the gaseous fluid acts as a conveying medium;
    valve means associated with said source and said conveying line for controlling the admission of material into said conveying line, while maintaining the supply of gaseous fluid under pressure to said conveying line;
    sensor means responsive to the level of fluidized material in a container to which material is to be conveyed through said conveying line including a tube adapted to extend into said container and terminate at a predetermined level and means for supplying gaseous fluid under pressure to said tube;
    means responsive to said sensor for controlling said valve means whereby when said sensor indicates the level of material in said container is below a predetermined level, said valve means may be opened to admit material into said conveying line and when said sensor indicates the level of material in said container is at or above a predetermined level, said valve means is closed to prevent material from being admitted into said conveying line;
    said means responsive to said sensor includes means responsive to pressure in said tube for closing said valve means to prevent material from being admitted into said conveying line when the pressure in said tube rises above a predetermined amount and permitting said valve means to be opened to admit material into said conveying line when the pressure in said tube falls below said predetermined amount;
    a pressure responsive valve mounted in said means for supplying gaseous fluid under pressure, conduit means for transmitting the pressure upstream of said pressure response valve to said valve means and conduit means for transmitting the pressure downstream of said pressure responsive valve to said valve means, said valve means including means for comparing the pressures upstream and downstream of the pressure responsive valve to thereby control the admission of material into the conveying line; said means responsive to said sensor including a normally open relief valve positioned in said conduit means for transmitting the pressure upstream of said pressure responsive valve, and fluid pressure means for closing said normally open relief valve when the pressure in said tube is above a predetermined amount to thereby prevent the pressure upstream of said pressure responsive valve from being transmitted to said valve means whereby said valve means closes to prevent material from being admitted to said conveying line.

2. A system for supplying solid particulate material such as sand to a vehicle such as a locomotive for use by the vehicle comprising:
    a first storage vessel;
    first conveying means for conducting solid particulate material from a source of material to the first storage vessel;

a second storage vessel mounted in a position elevated a distance sufficient to allow a vehicle to pass thereunder and including a vent;

second conveying means for conducting solid particulate material from said first storage vessel to the second storage vessel;

conduit means for conducting solid particulate material from the second storage vessel to a vehicle; and means for sensing the level of material in said second storage vessel;

said second conveying means comprising a material conveying line, means for supplying air under pressure to the conveying line whereby the air under pressure acts as the conveying medium, valve means operatively associated with the first storage vessel and said conveying line for controlling the admission of material to said conveying line, and means responsive to said means for sensing the level for controlling said valve means whereby when said sensor indicates the level of material in said second storage vessel is below a predetermined level, said valve means may be opened to admit material into the conveying line and material is conducted from the first storage vessel to the second storage vessel;

valve means operatively associated with said conduit means for controlling the flow of material from said second storage vessel to a vehicle;

a dust collector flow connected to said vent for removing solid particulate material in the air vented from the second storage vessel; and means for returning solid particulate material from the dust collector to the first storage vessel;

said second storage vessel including means defining sidewalls, endwalls, a top and a bottom; a gas permeable deck mounted in said vessel and spaced from the bottom thereof to define a plenum chamber therebelow and a material chamber thereabove;

means for supplying air under pressure to the plenum chamber for passage through said deck;

said deck defining an opening therethrough;

and said conduit means is flow connected to the opening in said deck.

3. In combination, a container for receiving, storing and discharging solid particulate material comprising means defining sidewalls, endwalls and a bottom, a gas permeable deck mounted in the container and spaced from the bottom to define a plenum chamber therebelow and a material chamber thereabove, means for supplying gaseous fluid under pressure to said plenum chamber for passage through the deck for fluidizing solid particulate material in said material chamber, said deck defining an opening therethrough, conduit means flow connected to said opening and extending through said plenum chamber for discharging material from said material chamber, valve means operatively associated with said conduit means for controlling the discharge of material from said chamber; and means for supplying solid particulate material to said container comprising conduit means, means for supplying fluid under pressure to said conduit means, and means for supplying solid particulate material to said conveying line, means for sensing the level of the fluidized material in said container including a tube extending into said container and terminating at a predetermined level in said container, and means for supplying gaseous fluid under pressure to said tube; and said means for supplying solid particulate material to said container is responsive to said means for sensing the level of fluidized material in the container.

* * * * *